(12) United States Patent
Steinhauser et al.

(10) Patent No.: US 9,718,912 B2
(45) Date of Patent: Aug. 1, 2017

(54) CARBINOL-TERMINATED POLYMERS CONTAINING ALLYLAMINE

(71) Applicant: ARLANXEO Deutschland GmbH, Dormagen (DE)

(72) Inventors: Norbert Steinhauser, Monheim (DE); Thomas Gross, Wuelfrath (DE); Fernanda Albino, Cologne (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 389 days.

(21) Appl. No.: 14/399,101

(22) PCT Filed: Apr. 29, 2013

(86) PCT No.: PCT/EP2013/058870
§ 371 (c)(1),
(2) Date: Nov. 5, 2014

(87) PCT Pub. No.: WO2013/167410
PCT Pub. Date: Nov. 14, 2013

(65) Prior Publication Data
US 2015/0118429 A1 Apr. 30, 2015

(30) Foreign Application Priority Data
May 9, 2012 (EP) .................... 12167357

(51) Int. Cl.
C08F 236/10 (2006.01)
C08C 19/25 (2006.01)
C08F 36/04 (2006.01)
C08C 19/44 (2006.01)
C08L 15/00 (2006.01)
(Continued)

(52) U.S. Cl.
CPC .......... *C08F 236/10* (2013.01); *B60C 1/0016* (2013.01); *C08C 19/25* (2013.01); *C08C 19/44* (2013.01); *C08F 36/04* (2013.01); *C08L 9/06* (2013.01); *C08L 15/00* (2013.01); *C08L 2205/02* (2013.01); *Y10T 428/139* (2015.01); *Y10T 428/215* (2015.01)

(58) Field of Classification Search
None
See application file for complete search history.

(56) References Cited

U.S. PATENT DOCUMENTS 3,244,664 A 4/1966 Zelinski et al.
4,185,042 A 1/1980 Verkouw
(Continued)

FOREIGN PATENT DOCUMENTS

DE EP 2452951 A1 * 5/2012 ............. C08C 19/44

OTHER PUBLICATIONS

Franta, I., Elastomers and Rubber Compounding Materials, Manufacture, Properties and Applications, Studies in Polymer Science, 1, 1989, Elsevier, pp. 113-131.
(Continued)

*Primary Examiner* — Vickey Nerangis

(57) ABSTRACT

The present invention relates to diene polymers or diene copolymers, wherein the diene polymers or diene copolymers have, at the start of the polymer chains, tertiary amino groups of the formula (Ia), (Ib), (IIa) or (IIb)

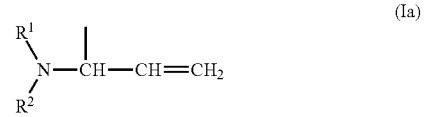

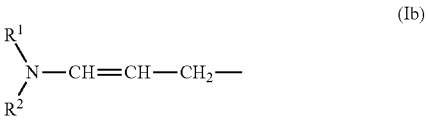

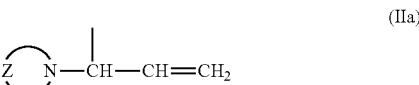

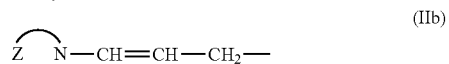

where
$R^1$, $R^2$ are the same or different and are each alkyl, cycloalkyl, aryl, alkaryl and aralkyl radicals which may contain heteroatoms such as O, N, S and/or Si,
Z is a divalent organic radical which, as well as C and H, may contain heteroatoms such as O, N, S and/or Si,
and, at the end of the polymer chains, silane-containing carbinol groups of the formula (III)

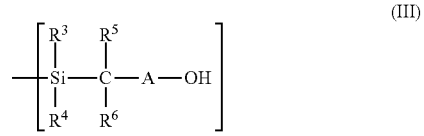

or metal salts thereof or semimetal salts thereof, where $R^3$, $R^4$, $R^5$, $R^6$ are the same or different and are each an H or alkyl, cycloalkyl, aryl, alkaryl and aralkyl radicals which may contain heteroatoms such as O, N, S and/or Si,
A is a divalent organic radical which, as well as C and H, may contain heteroatoms such as O, N, S and/or Si.

25 Claims, No Drawings

(51) Int. Cl.
  *B60C 1/00*    (2006.01)
  *C08L 9/06*    (2006.01)

(56) References Cited

U.S. PATENT DOCUMENTS

| | | | |
|---|---|---|---|
| 4,417,029 A | 11/1983 | Milkovich | |
| 4,616,069 A | 10/1986 | Watanabe et al. | |
| 4,618,650 A | 10/1986 | Halasa et al. | |
| 5,290,901 A | 3/1994 | Burns et al. | |
| 5,416,168 A | 5/1995 | Willis et al. | |
| 5,502,131 A * | 3/1996 | Antkowiak | C08C 19/44 |
| | | | 525/332.3 |
| 5,521,309 A | 5/1996 | Antkowiak et al. | |
| 5,536,801 A | 7/1996 | Antkowiak et al. | |
| 5,625,017 A | 4/1997 | Morita et al. | |
| 5,659,056 A | 8/1997 | Hergenrother et al. | |
| 5,665,829 A | 9/1997 | Shepherd et al. | |
| 5,792,820 A | 8/1998 | Lawson et al. | |
| 6,013,718 A | 1/2000 | Cabioch et al. | |
| 6,025,450 A | 2/2000 | Lawson et al. | |
| 6,255,404 B1 | 7/2001 | Hogan et al. | |
| 6,279,632 B1 | 8/2001 | Hogan et al. | |
| 6,333,375 B1 | 12/2001 | Nakamura et al. | |
| 6,790,889 B2 | 9/2004 | Hergenrother et al. | |
| 7,528,199 B2 | 5/2009 | Taniguchi et al. | |
| 8,895,684 B2 | 11/2014 | Thiele et al. | |
| 9,587,059 B2 * | 3/2017 | Steinhauser | C08C 19/44 |
| 2008/0308204 A1 | 12/2008 | Hogan et al. | |
| 2009/0239974 A1 * | 9/2009 | Mori | B60C 1/0016 |
| | | | 523/152 |
| 2013/0281605 A1 * | 10/2013 | Steinhauser | C08C 19/44 |
| | | | 524/526 |
| 2016/0083531 A1 | 3/2016 | Steinhauser et al. | |

OTHER PUBLICATIONS

Mueller, Eugen, et al., Methods of Organic Chemistry, Houbel-Weyl, Thieme Verlag, Stuttgart, 1961, vol. XIV/1, pp. 645-673.
Fontanille, Michel, Carbanionic Polymerization: General Aspects and Initiation, Comprehensive Polymer Science and Supplements, 1989, vol. 3, Elsevier, Abstract.
International Search Report from International Application No. PCT/EP2013/058870, dated Jun. 24, 2013, two pages.

* cited by examiner

CARBINOL-TERMINATED POLYMERS CONTAINING ALLYLAMINE

The invention relates to diene polymers with functianalizations at the start of the polymer chains and at the end of the polymer chains, and to the preparation and use thereof.

Important properties desirable Ira tyre treads Include good adhesion on dry and wet surfaces, and high abrasion resistance. It is very difficult to improve the skid resistance of a tyre without simultaneously worsening the rolling resistance and abrasion resistance. A low rolling resistance is important for low fuel consumption, and high abrasion resistance is a crucial factor for a long lifetime of the tyre.

Wet skid resistance and rolling resistance of a tyre tread depend largely on the dynamic/mechanical properties of the rubbers which are used in the blend production. To lower the rolling resistance, rubbers with a high resilience at higher temperatures (60° C. to 100° C.) are used for the tyre tread. On the other hand, for lowering of the wet skid resistance, rabbets having a high damping factor at low temperatures (0 to 23° C.) or low resilience in the range of 0° C. to 23° C. are advantageous. In order to fulfil this complex profile of requirements, mixtures of various robbers are used in the tread. Usually, mixtures of one or more rubbers having a relatively high glass transition temperature, such as styrene-butadiene rubber, and one or more robbers having a relatively low glass transition temperature, such as polybutadiene having a high 1,4-cis content or a styrene-butadiene rubber having a low styrene and low vinyl content or a polybutadiene prepared in solution and having a moderate 1,4-cis and low vinyl content, are used.

Anionically polymerized solution rubbers containing double bonds, such as solution polybutadiene and solution styrene-butadiene rubbers, have advantages over corresponding emulsion rubbers in terms of production of tyre treads with low rolling resistance. The advantages lie, inter alia, in the controllability of the vinyl content and of the associated glass transition temperature and molecular branching. In practical use, these give rise to particular advantages in the relationship between wet skid resistance and rolling resistance of the tyre. Important contributions to energy dissipation and hence to rolling resistance in tyre treads result from free ends of polymer chains and from the reversible buildup and degradation of the filler network formed by the filler used in the tyre tread mixture (usually silica and/or carbon black).

The introduction of functional groups at the start of the polymer chains and/or end of the polymer chains enables physical or chemical attachment of the start of the chains and/or end of the chains to the filler surface, This restricts the mobility thereof and hence reduces energy dissipation under dynamic stress on the tyre tread. At the same time, these functional groups can improve the dispersion of the filler in the tyre tread, which can lead to a weakening of the filler network and hence to further lowering of the rolling resistance.

Methods for introducing functional groups at the start of polymer chains by means of functional anionic polymerization initiators are described, for example, in EP 0 513 217 B1 and EP 0 675 140 B1 (initiators with a protected hydroxyl group), US 2008/0308204 A1 (thioether-containing initiators) and in U.S. Pat. No. 5,792,820 and EP 0 590 490 B1 (alkali metal amides of secondary amines as polymerization initiators).

More particularly, EP 0 594 107 B1 describes the in situ use of secondary amines as functional polymerization initiators, but does not describe the chain end functionalization of the polymers. U.S. Pat. Nos. 5,502,131, 5,521,309 and 5,536,801 detail the introduction of tertiary amino groups at the start of the polymer chains by means of anionic polymerization initiators, these polymerization initiators having been obtained by reaction of allyl- or xylylamines with organo-alkali metal compounds.

In addition, numerous methods have been developed for introduction of functional groups at the end of polymer chains. For example, EP 0 180 141 A1 describes the use of 4,4'-bis(dimethylamino)benxophenone or N-methylcaprolactam as functionalization reagents. The use of ethylene oxide and N-vinylpyrrolidone is known from EP 0 864 606 A1. A number of further possible functionalization reagents are detailed in U.S. Pat. No. 4,417,029.

Especially silanes having a total of at least two halogen and/or alkyloxy and/or aryloxy substituents on silicon are of good suitability for functionalization at the ends of the polymer chains of diene rubbers, since one of the said substituents on the silicon atom can be readily exchanged for an anionic diene polymer chain end and the farther aforementioned substituent(s) on Si is/are available as a functional group which, optionally after hydrolysis, can interact with the filler of the tyre tread mixture. Examples of such silanes can be found in U.S. Pat. Nos. 3,244,664, 4,185,042, EP 0 890 580 A1.

However, many of the reagents mentioned for functionalization at the ends of the polymer chains have disadvantages, for example poor solubility in the process solvent, high toxicity or high volatility, which can lead to contamination of the recycled solvent. In addition, many of these functionalization reagents can react with more than one anionic polymer chairs end, which leads to coupling reactions which are often troublesome and difficult to control. This is particularly true of the silanes mentioned. These also have the further disadvantage that reaction of these silanes with the anionic end of the polymer chairs eliminates components such as halides or alkoxy groups, the latter being readily convertible to alcohols. Halides promote corrosion; alcohols can lead to contamination of the process solvent. A further disadvantage of the use of silanes as functionalization reagents is that the siloxane-terminated polymers obtained therefrom, after functionalization via the Si—OR groups at the ends of the polymer chains (or via the Si—OH groups after hydrolysis of the Si—OR groups), can couple to form Si—O—Si bonds, which leads to an unwanted rise in viscosity of the rubbers during processing and storage. Many methods for reducing this rise in viscosity in siloxane-terminated polymers have been described, for example the addition of stabilizing reagents based on acid and acid halides (EP 0 801 078 A1), addition of siloxane (EP 1 198 506 B1), addition of long-chain alcohols (EP 1 237 934 B1) or addition of reagents to control the pH (EP 1 726 598).

EP 0 778 311 B1 describes, inter alia, cyclosiloxanes as functionalization reagents for introduction of Si—OH groups at the ends of the polymer chains. These cyclosiloxanes have the advantage over the abovementioned silanes that only one anionic end of the polymer chairs in each case can react per cyclosiloxane molecule. Thus, during the functionalization reaction, no couplings take place through addition of more than one polymer chain per functionalization reagent. The Si—OH end groups formed after introduction of the functionalization reagents can, however, as explained above and also described in U.S. Pat. No. 4,618,650, couple to form Si—O—Si bonds. Here too, there is thus the problem of the unwanted rise in viscosity during processing and storage.

It was therefore an object of the present invention to provide functionalized diene polymers which do not have the disadvantages of the prior art, and more particularly enable utilization of the good reactivity of silanes having anionic ends of the polymer chains without having the disadvantages thereof, for instance reaction of several anionic ends of polymer chains per silane molecule, elimination of troublesome components and coupling to form Si—O—Si bonds in the course of processing and storage.

For achievement of this object, functionalized diene polymers are proposed, these having, at the start of the polymer chains, tertiary amino groups of the formula (Ia), (Ib), (IIa) or (IIb)

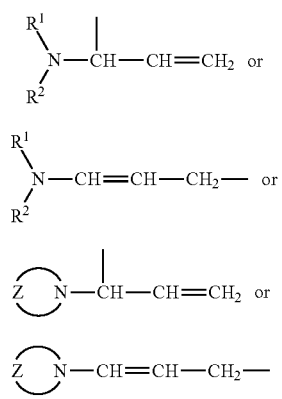

where $R^1$, $R^2$ are the same or different and are each alkyl, cycloalkyl, aryl, alkaryl and aralkyl radicals which may contain heteroatoms such as O, N, S and/or Si, Z is a divalent organic radical which, as well as C and H, may contain heteroatoms such as O, N, S and/or Si, and, at the end of the polymer chains, silane-containing carbinol groups of the formula (III)

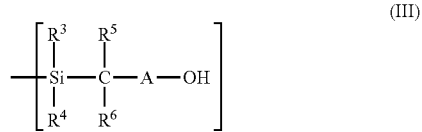

or metal salts thereof or semimetal salts thereof, where $R^3$, $R^4$, $R^5$, $R^6$ are the same or different and are each an H or alkyl, cycloalkyl, aryl, alkaryl and aralkyl radicals which may contain heteroatoms such as O, N, S and/or Si, A is a divalent organic radical which, as well as C and H, may contain heteroatoms such as O, N, S and/or Si.

Preferably, the silane-containing carbinol groups of the formula (III) at the end of the polymer chains of the inventive functionalized diene polymers may be in the form of metal salts of the formula (IV):

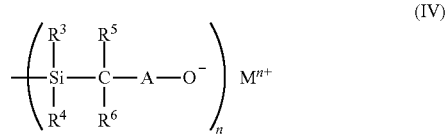

where $R^3$, $R^4$, $R^5$, $R^6$ are the same or different and are each H, alkyl, cycloalkyl, aryl, alkaryl and aralkyl radicals which may contain heteroatoms such as O, N, S and/or Si, A is a divalent organic radical which, as well as C and H, may contain heteroatoms such as O, N, S and/or Si, n is an integer from 1 to 4, M is a metal or semimetal of valency 1 to 4, preferably Li, Na, K, Mg, Ca, Fe, Co, Ni, Al, Nd, Ti, Si and/or Sn.

Preferred polymers for preparation of the inventive functionalized diene polymers are diene polymers, and diene copolymers obtainable by copolymerization of dienes with vinylaromatic monomers.

Preferred dienes are 1,3-butadiene, isoprene, 1,3-pentadiene, 2,3-dimethylbutadiene, 1-phenyl-1,3-butadiene and/or 1,3-hexadiene. Particular preference is given to using 1,3-butadiene and/or isoprene.

The vinylaromatic comonomers may, for example, be styrene, o-, m- and/or p-methylstyrene, p-tert-butylstyrene, α-methylstyrene, vinylnaphthalene, divinylbenzene, trivinylbenzene and/or divinylnaphthalene. Particular preference is given to using styrene.

These polymers are preferably prepared by anionic solution polymerization.

Polymerization initiators for the anionic solution polymerization are organo-alkali metal compounds containing tertiary allylamines, which are obtained by reaction of organo-alkali metal compounds with tertiary N-allylamines. Examples of tertiary allylamines are N,N-dimethylallylamine, N,N-diethylallylamine, N,N-diisopropylallylamine, N,N-dihexylallylamine, N,N-diphenylallylamine, N,N-dibenzylallylamine, N-allylpyrrolidine, N-allylhexamethyleneimine.

Preferred organo-alkali metal compounds for reaction with the tertiary allylamines are n-butyllithium and sec-butyllithium. The reaction of the tertiary allylamines with the organo-alkali metal compounds to give the polymerization initiator containing tertiary amines can be effected in a separate preforming step, or the reaction can be performed in situ directly in the polymerization reactor.

In addition, it is possible to use the known randomizers and control agents for the microstructure of the polymer, for example diethyl ether, di-n-propyl ether, diisopropyl ether, di-n-butyl ether, ethylene glycol dimethyl ether, ethylene glycol diethyl ether, ethylene glycol di-n-butyl ether, ethylene glycol di-tert-butyl ether, diethylene glycol dimethyl ether, diethylene glycol diethyl ether, diethylene glycol di-n-butyl ether, diethylene glycol di-tert-butyl ether, 2-(2-ethoxyethoxy)-2-methylpropane, triethylene glycol dimethyl ether, tetrahydrofuran, ethyl tetrahydrofurfuryl ether, hexyl tetrahydrofurfuryl ether, 2,2-bis(2-tetrahydrofuryl)propane, dioxane, trimethylamine, triethylamine, N,N,N',N'-tetramethylethylenediamine, N-methylmorpholine, N-ethylmorpholine, 1,2-dipiperidinoethane, 1,2-dipyrrolidinoethane, 1,2-dimorpholinoethane and potassium and sodium salts of alcohols, phenols, carboxylic acids, sulphonic acids.

Such solution polymerizations are known and are described, for example, in 1. Franta, Elastomers and Rubber Compounding Materials; Elsevier 1989, pages 113-131, in Houben-Weyl, Methoden der Organischen Chemie [Methods of Organic Chemistry], Thieme Verlag, Stuttgart, 1961, volume XIV/1 pages 645 to 673 or in volume E 20 (1987), pages 114 to 134 and pages 134 to 153, and in Comprehensive Polymer Science, Vol. 3, Part I (Pergamon Press Ltd., Oxford 1989), pages 365-386.

The preparation of the preferred diene polymers preferably takes place in a solvent. The solvents used for the polymerization are preferably inert aprotic solvents, for example paraffinic hydrocarbons, such as isomeric butanes, pentanes, hexanes, heptanes, octanes, decanes, cyclopentane, cyclohexane, methylcyclohexane, ethylcyclohexane or 1,4-dimethylecyclohexane or aromatic hydrocarbons, such as benzene, toluene, ethylbenzene, xylene, diethylbenzene or propylbenzene. These solvents can be used individually or in combination. Preference is given to cyclohexane and n-hexane. Blending with polar solvents is likewise possible.

The amount of solvent in the process according to the invention is typically 100 to 1000 g, preferably 200 to 700 g, based on 100 g of the total amount of monomer used. However, it is also possible to polymerize the monomers used in the absence of solvents.

The polymerization can be performed in such a way that the monomers, optionally control agents to adjust the microstructure and the solvents are initially charged and then the polymerization is started by adding the initiator. Polymerization in a feed process is also possible, in which the polymerization reactor is filled by addition of monomers, optionally control agents to adjust the microstructure and solvents, the initiator being initially charged or added with the monomers, optionally control agents to adjust the microstructure and the solvent. Variations are possible, such as initial charging of the solvent in the reactor, addition of the initiator and then addition of the monomers and optionally control agents to adjust the microstructure. In addition, the polymerization can be operated in a continuous mode. Further addition of monomer, control agent and solvent during or at the end of the polymerization is possible in all cases.

In a preferred embodiment, the monomers, optionally control agents to adjust the microstructure, the solvent and a tertiary allylamine are initially charged, and the polymerization is started by addition of an organo-alkali metal compound, such as BuLi, with formation of the tertiary amine-containing polymerization initiator in situ through reaction of the organo-alkali metal compound with the tertiary allylamine.

The polymerization time may vary within wide limits from a few minutes to a few hours. Typically, the polymerization is performed within a period of about 10 minutes up to 8 hours, preferably 20 minutes to 4 hours. It can be performed either at standard pressure or at elevated pressure (1 to 10 bar).

It has been found that, surprisingly, through the use of tertiary allylamine-containing polymerization initiators for introduction of tertiary amino groups of the formula Ia, Ib, IIa or IIb at the start of the polymer chains in combination with the use of one or more 1-oxa-2-silacycloalkanes as functionalization reagents for introduction of functional groups at the end of the polymer chains, it is possible to prepare diene polymers which have improved tyre tread properties and do not have the disadvantages of the prior art. For example, couplings through multiple reactions of the functionalization reagent, elimination of troublesome components and couplings through formation of Si—O—Si bonds in the course of workup and storage of the polymers cannot take place.

The tertiary allylamine-containing polymerization initiators are compounds of the general formula (Va), (Vb), (VIa) or (VIb)

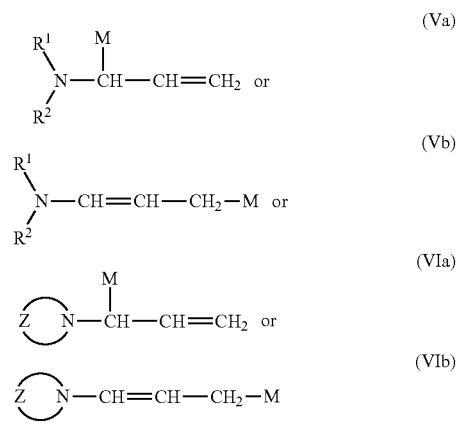

where
$R^1$, $R^2$ are the same or different and are each alkyl, cycloalkyl, aryl, alkaryl and aralkyl radicals which may contain heteroatoms such as O, N, S and/or Si,
Z is a divalent organic radical which, as well as C and H, may contain heteroatoms such as O, N, S and/or Si,
M is Li, Na, K, The 1-oxa-2-silacycloalkanes are compounds of the general formula (VII)

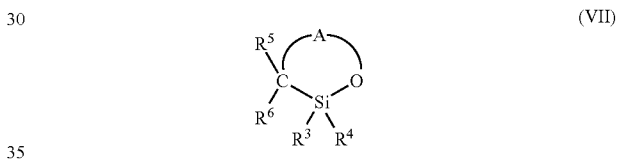

where
$R^3$, $R^4$, $R^5$, $R^6$ are the same or different and are each H, alkyl, cycle-alkyl, aryl, alkaryl and aralkyl radicals which may contain heteroatoms such as O, N, S and/or Si.
A is a divalent organic radical which, as well as C and H, may contain heteroatoms such as O, N, S and/or Si.

The silicon atom of the formula (VII) is monofunctional, "monofunctional" being understood to mean that the silicon atom has three Si—C bonds and one Si—O bond.

Examples of compounds of the formula (VII) are:

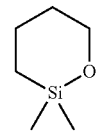

2,2-dimethyl-1-oxa-2-silacyclohexane

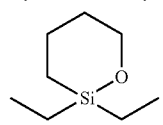

2,2-diethyl-1-oxa-2-silacyclohexane

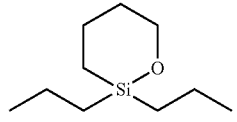

2,2-dipropyl-1-oxa-2-silacyclohexane

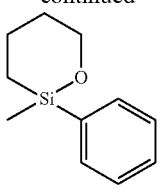

2-methyl-2-phenyl-1-oxa-2-silacyclohexane

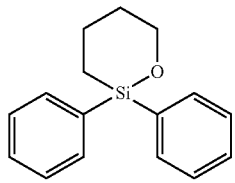

2,2-diphenyl-1-oxa-2-silacyclohexane

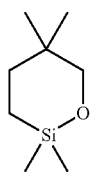

2,2,5,5-tetramethyl-1-oxa-2-silacyclohexane

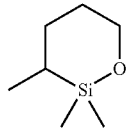

2,2,3-trimethyl-1-oxa-2-silacyclohexane

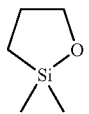

2,2-dimethyl-1-oxa-2-silacyclopentane

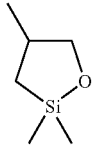

2,2,4-trimethyl-1-oxa-2-silacyclopentane

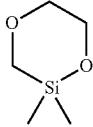

2,2-dimethyl-1,4-dioxa-2-silacyclohexane

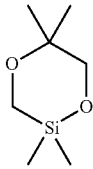

2,2,5,5-tetramethyl-1,4-dioxa-2,5-disilacyclohexane

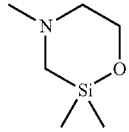

2,2,4--trimethyl-[1,4,2]oxazasilinane

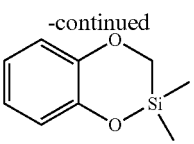

benzo-2,2-dimethyl-1,4-dioxa-2-silacyclohexane

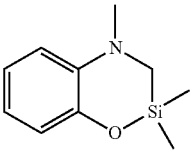

benzo-2,2,4-trimethyl-1-oxa-4-aza-2-silacyclohexane

It has been found that the inventive functionalized diene polymers can be prepared by reaction of reactive ends of polymer chains with 1-oxa-2-silacycloalkanes and optional subsequent protonation of the alkoxide end group to give the alcohol.

Thus, the invention also provides for the use of 1-oxa-2-silacycloalkanes as functionalization reagents for preparation of the inventive functionalized diene polymers having end groups of the formula (III) or (IV).

The inventive functionalized diene polymers preferably have mean molar masses (number-average) of 10 000 to 2 000 000 g/mol, preferably 100 000 to 1 000 000 g/mol, and glass transition temperatures of −110° C. to +20° C., preferably −110° C. to 0° C., and Mooney viscosities ML 1+4 (100° C.) of 10 to 200, preferably 30 to 150, Mooney units.

The invention further provides a process for preparing the inventive functionalized diene polymers, according to which tertiary allylamine-containing polymerization initiators are used, as are one or more compounds of the formula (VII), as a pure substance, solution or suspension, for reaction with the reactive ends of the polymer chains. The compounds of the formula (VII) are preferably added after the polymerization has concluded, but they can also be added prior to complete monomer conversion. The reaction of compounds of the formula (VII) with the reactive ends of the polymer chains is effected at the temperatures customarily used for the polymerisation. The reaction times for the reaction of compounds according to formula (VII) with the reactive ends of the polymer chains may be between a few minutes and several hours.

Preference is given to a process for preparing the inventive functionalized diene polymers in which the polymerization initiators are obtained by reaction of tertiary allylamines with organo-alkali metal compounds in a separate preforming step or in sins directly in the polymerization reactor, and one or more compounds of the formula (VII) are used, as a pure substance, solution or suspension, for reaction with the reactive ends of the polymer chains. The compounds of the formula (VII) are preferably added after the polymerization has concluded, but they cars also be added prior to complete monomer conversion. The reaction of compounds of the formula (VII) with the reactive ends of the polymer chains is effected at the temperatures customarily used for the polymerization. The reaction times for the reaction of compounds according to formula (VII) with the reactive ends of the polymer chains may be between a few minutes and several hours.

The molar amount of tertiary allylamines is preferably less than or equal to the molar amount of organo-alkali metal compounds, particular preference being given to a molar ratio between tertiary allylamine and organo-alkali metal compound of 0.05-2.00:0.05-2.00.

It has been found that, with this molar ratio, the ends of the polymer chains are functionalized with silane-containing carbinol compounds, so as to form diene polymers with functionalization at both ends, these having improved tyre tread properties, with avoidance of couplings through multiple reactions of the functionalization reagent, elimination of troublesome components and couplings through formation of Si—O—Si bonds in the course of workup and storage of the polymers.

The amount of the 1-oxa-2-silacycloalkanes can be selected such that all the reactive ends of the polymer chains react with compounds of the formula (VII), or it is possible to use a deficiency of these compounds. The amounts of the compounds of formula (VII) used may cover a wide range. The preferred amounts are between 0.005-2% by weight, more preferably between 0.01-1% by weight, based on the amount of polymer.

In addition to compounds of formula (VII), it is also possible to use the coupling reagents typical of anionic diene polymerisation for reaction with the reactive ends of polymer chains. Examples of such coupling reagents are silicon tetrachloride, methyltrichlorosilane, dimethyldichlorosilane, tin tetrachloride, dibutyltin dichloride, tetraalkoxysilanes, ethylene glycol diglycidyl ether, 1,2,4-tris(chloromethyl) benzene. Such coupling reagents can be added prior to, together with or after the compounds of the formula (VII).

On completion of addition of compounds of the formula (VII) and optionally of coupling reagents, before or during the workup of the inventive functionalized polymers, preference is given to adding the customary ageing stabilizers, such as sterically hindered phenols, aromatic amines, phosphites, thioethers. In addition, it is possible to add the customary extender oils used for diene rubbers, such as DAE (Distillate Aromatic Extract), TDAE (Treated Distillate Aromatic Extract), MES (Mild Extraction Solvates), RAE (Residual Aromatic Extract), TRAE (Treated Residual Aromatic Extract), naphthenic and heavy naphthenic oils. It is also possible to add fillers, such as carbon black and silica, rubbers and rubber auxiliaries.

The solvent can be removed from the polymerization process by the customary methods, such as distillation, stripping with steam or application of reduced pressure, optionally at elevated temperature.

The invention further provides for the use of the inventive functionalized polymers for production of vulcanizable rubber compositions.

These vulcanizable rubber compositions preferably comprise farther rubbers, fillers, rubber chemicals, processing aids and extender oils.

Additional rubbers are, for example, natural rubber and synthetic rubbers. If present, the amount thereof is preferably within the range from 0.5 to 95%, preferably 10 to 80%, by weight, based on the total amount of polymer in the mixture. The amount of rubbers additionally added is again guided by the respective end use of the inventive mixtures.

Synthetic rubbers known from the literature are listed here by way of example. They comprise, inter alia, BR—polybutadiene
ABR—butadiene/$C_1$-$C_4$-alkyl acrylate copolymers
IR—polyisoprene
E-SBR—styrene-butadiene copolymers having styrene contents of 1-60%, preferably 20-50%, by weight, prepared by emulsion polymerization
S-SBR—styrene-butadiene copolymers having styrene contents of 1-60%, preferably 15-45%, by weight, prepared by solution polymerization
IIR—isobutylene-isoprene copolymers
NBR—butadiene-acrylonitrile copolymers having acrylonitrile contents of 5-60%, preferably 10-40%, by weight
HNBR—partly hydrogenated or fully hydrogenated NBR rubber
EPDM—ethylene-propylene-diene terpolymers
and mixtures of these rubbers. For the production of ear tyres, particularly natural rubber, E-SBR and S-SBR having a glass transition temperature above −60° C., polybutadiene rubber which has a high cis content (>90%) and has beers prepared with catalysts based on Ni, Co, Ti or Nd, and polybutadiene rubber having a vinyl content of up to 80% and mixtures thereof are of interest.

Useful fillers for the inventive rubber compositions include all known fillers used in the rubber industry. These Include both active and inactive fillers.

The following should be mentioned by way of example:
finely divided silicas, produced, for example, by precipitation of solutions of silicates or flame hydrolysis of silicon halides having specific surface areas of 5-1000, preferably 20-400, $m^2/g$ (BET surface area) and having primary particle sizes of 10-400 nm. The silicas may optionally also be present as mixed oxides with other metal oxides, such as oxides of Al, Mg, Ca, Ba, Zn, Zr, Ti;
synthetic silicates, such as aluminium silicate, alkaline earth metal silicates such as magnesium silicate or calcium silicate, having BET surface areas of 20-400 $m^2/g$ and primary particle diameters of 10-400 nm;
natural silicates, such as kaolin and other naturally occurring silica;
glass fibres and glass fibre products (mats, strands) or glass microspheres;
metal oxides, such as zinc oxide, calcium oxide, magnesium oxide, aluminium oxide;
metal carbonates, such as magnesium carbonate, calcium carbonate, zinc carbonate;
metal hydroxides, for example aluminium hydroxide, magnesium hydroxide;
metal sulphates, such as calcium sulphate, barium sulphate;
carbon blacks: The carbon blacks to be used here are carbon blacks produced by the lamp black, channel black, furnace black, gas black, thermal black, acetylene black or light arc process and have BET surface areas of 9-200 $m^2/g$, for example SAF, ISAF-LS, ISAF-HM, ISAF-LM, ISAF-HS, CF, SCF, HAF-LS, HAF, HAF-HS, FF-HS, SPF, XCF, FEF-LS, FEF, FEF-HS, GPF-HS, GPF, APF, SRF-LS, SRF-LM, SRF-HS, SRF-HM and MT carbon blacks, or ASTM N110, N219, N220, N231, N234, N242, N294, N326, N327, N330, N332, N339, N347, N351, N356, N358, N375, N472, N539, N550, N568, N650, N660, N754, H762, N765, N774, N787 and N990 carbon blacks;
rubber gels, especially those based on BR, E-SBR and/or polychloroprene having particle sizes of 5 to 1000 nm.

The fillers used are preferably finely divided silicas and/or carbon blacks.

The fillers mentioned can be used alone or in a mixture. In a particularly preferred embodiment, the rubber compositions comprise, as fillers, a mixture of light-coloured fillers, such as finely divided silicas, and carbon blacks, the mixing ratio of light-coloured fillers to carbon blacks being 0.01:1 to 50:1, preferably 0.05:1 to 20:1.

The fillers are used here in amounts in the range from 10 to 500 parts by weight based on 100 parts by weight of rubber. Preference is given to using 20 to 200 parts by weight.

In a further embodiment of the invention, the rubber compositions also comprise rubber auxiliaries which, for example, improve the processing properties of the rubber compositions, serve to crosslink the rubber compositions, improve the physical properties of the vulcanizates produced from the inventive rubber compositions for the specific end use thereof, improve the interaction between rubber and filler, or serve for attachment of the rubber to the filler.

Rubber auxiliaries are, for example, crosslinker agents, for example sulphur or sulphur-supplying compounds, and also reaction accelerators, ageing stabilizers, heat stabilizers, light stabilizers, antiozonants, processing aids, plasticizers, tackifiers, blowing agents, dyes, pigments, waxes, extenders, organic acids, silanes, retardants, metal oxides, extender oils, for example DAE (Distillate Aromatic Extract), TDAE (Treated Distillate Aromatic Extract), MES (Mild Extraction Solvates), RAE (Residual Aromatic Extract), TRAE (Treated Residual Aromatic Extract), naphthenic and heavy naphthenic oils and activators.

The total amount of rubber auxiliaries is within the range from 1 to 300 parts by weight, based on 100 parts by weight of overall rubber. Preference is given to using 5 to 150 parts by weight of rubber auxiliaries.

The vulcanizable rubber compositions can be produced in a one-stage or in a multistage process, preference being given to 2 to 3 mixing stages. For example, sulphur and accelerator can be added in a separate mixing stage, for example on a roller, preferred temperatures being in the range of 30° C. to 90° C. Preference is given to adding sulphur and accelerator in the last mixing stage.

Examples of equipment suitable for the production of the vulcanizable rubber compositions include rollers, kneaders, internal mixers or mixing extruders.

Thus, the invention further provides vulcanizable rubber compositions comprising functionalized polymers having tertiary amino groups of the formula (Ia), (Ib), (IIa) or (IIb) at the start of the polymer chains and functional groups of the formula (III) or (IV) at the end of the polymer chains.

The rubber compositions may also comprise functionalized diene polymers having tertiary amino groups of the formula (Ia), (Ib), (IIa) or (IIb) at the start of the polymer chains and functional groups of the formula (III) and (IV) at the end of the polymer chains.

The invention further provides for the use of the inventive vulcanizable rubber compositions for production of rubber vulcanizates, especially for the production of tyres, especially tyre treads, having particularly low rolling resistance coupled with high wet skid resistance and abrasion resistance.

The inventive vulcanizable rubber compositions are also suitable for production of mouldings, for example for the production of cable sheaths, hoses, drive belts, conveyor belts, roll covers, shoe soles, sealing rings and damping elements.

The examples which follow serve to illustrate the invention but have no limiting effect.

EXAMPLES

Example 1a

Synthesis of styrene-butadiene copolymer, unfunctionalized (Comparative Example)

An inertized 20 l reactor was charged with 8.5 kg of hexane, 1185 g of 1,3-butadiene, 315 g of styrene, 8 mmol of 2,2-bis(2-tetrahydrofuryl)propane and 10.3 mmol of n-butyllithium, and the contents were heated to 65° C. Polymerization was effected with stirring at 65° C. for 25 min. Subsequently, 10.3 mmol of cetyl alcohol were added, the rubber solution was discharged and stabilized by addition of 3 g of Irganox® 1520 (2,4-bis(octylthiomethyl)-6-methylphenol), and the solvent was removed by stripping with steam. The rubber crumbs were dried at 65° C. under reduced pressure.

Vinyl content (IR spectroscopy): 50.2% by weight; styrene content (IR spectroscopy): 20.9% by weight, glass transition temperature (DSC): −25.6° C.; number-average molecular weight $M_n$ (GPC, PS standard): 258 kg/mol; $M_w/M_n$:1.15; Mooney viscosity (ML1+4 at 100° C.): 52 ME Example 1b Synthesis of styrene-butadiene copolymer with tertiary amino group at the start of the chain (Comparative Example)

An inertized 20 l reactor was charged with 8.5 kg of hexane, 1185 g of 1,3-butadiene, 315 g of styrene, 9.9 mmol of 2,2-bis(2-tetrahydrofuryl)propane, 14.6 mmol of N,N-dimethylallylamine and 14.6 mmol of n-butyllithium, and the contents were heated to 65° C. Polymerization was effected with stirring at 65° C. for 25 min. Subsequently, 14.6 mmol of cetyl alcohol were added, the rubber solution was discharged and stabilized by addition of 3 g of Irganox® 1520, and the solvent was removed by stripping with steam. The rubber crumbs were dried at 65° C. under reduced pressure.

Vinyl content (IR spectroscopy): 51.7% by weight; styrene content (IR spectroscopy): 20.9% by weight, glass transition temperature (DSC): −23.5° C., number-average molecular weight $M_n$ (GPC, PS standard): 268 kg/mol; $M_w/M_n$: 1.15; Mooney viscosity (ML1+4 at 100° C.): 59 ME Example 1c Synthesis of styrene-butadiene copolymer with functionalization at the end of the chain by reaction with functionalization reagent of the formula (VII) (Comparative Example)

An inertized 20 l reactor was charged with 8.5 kg of hexane, 1185 g of 1,3 -butadiene, 315 g of styrene, 8.2 mmol of 2,2-bis(2tetrahydrofury)propane and 10.55 mmol of n-buttllithium, and the contents were heated to 65° C. Polymerization was effected with stirring at 65° C. for 25 min. Thereafter, 10.55 mmol (1.69 ml)of 2,2,4-trimethyl-[1,4,2]oxazasilinane were added, and the reactor contents were heated to 65° C. for a further 20 min. Subsequently, the rubber solution was discharged and stabilized by addition of 3 g of Irganox® 1520, and the solvent was removed by stripping with steam. The rubber crumbs were dried at 65° C. under reduced pressure.

Vinyl content (IR spectroscopy): 50.3% by weight; styrene content (IR spectroscopy): 20.9 % by weight, glass transition temperature (DSC): −25.7° C.; number-average molecular weight $M_n$ (GPC, PS standard): 216 kg/mol; $M_w/M_n$: 1.18; Mooney viscosity (ML1−4 at 100° C.): 44 ME

Example 1d

Synthesis of Styrene-butadiene copolymer with tertiary amino group at the start of the chain and functionalization at the end of the chain by reaction with functionalization reagent of the formula (VII) (Inventive)

An inertized 20 l reactor was charged with 8.5 kg of hexane, 1185 g of 1,3-butadiene, 315 g of styrene, 8.6 mmol of 2,2-bis(2-tetrahydrofuryl)propane, 11.6 mmol of N,N-dimethylallylamine and 11.6 mmol of butyllithium, and the contents were heated to 65° C. Polymerization was effected with stirring at 65° C. for 25 min. Thereafter, 11.6 mmol (1.85 ml) of 2,2,4-trimethyl-[1,4,2]oxazasilinane were added, and the reactor contents were heated to 65° C. for a further 20 min. Subsequently, the rubber solution was discharged and stabilized by addition of 3 g of Irganox® 1520, and the solvent was removed by stripping with steam. The rubber crumbs were dried at 65° C. under reduced pressure.

Vinyl content (IR spectroscopy): 49.8% by weight; styrene content (IR spectroscopy): 21.0% by weight, glass transition temperature (DSC): −25.6° C.; number-average molecular weight $M_n$ (GPC, PS standard): 222 kg/mol; $M_w/M_n$: 1.11; Mooney viscosity (ML1+4 at 100° C.): 42 ME

Examples 2a-d rubber compositions

Rubber compositions for tyre treads were produced using the styrene-butadiene copolymers of Examples 1a-1d.

The constituents are listed in Table 1. The rubber compositions (apart from sulphur and crosslinker) were produced in a 1.5 l kneader. Sulphur and accelerator were subsequently mixed in on a roller at 40° C.

Examples 3a-d vulcanizate properties

To determine the vulcanizate properties, the rubber compositions of Examples 2a-d were vulcanized at 160° C. for 20 minutes. The properties of the corresponding vulcanizates are listed in Table 2 as Examples 3a-d.

Using the vulcanizates, the following properties were determined to the standards specified:
resilience at 60° C. (to DIN 53512)
abrasion (to DIN 53516)
ΔG*: difference between the frequency-dependent viscoelastic moduli G* at 0.5% elongation and 15% elongation at 60° C./1 Hz (MTS amplitude sweep)
tan δ maximum: maximum dynamic damping in the measurement of the frequency-dependent viscoelastic modulus at 60° C./1 Hz, where tan δ=G"/G' (MTS amplitude sweep)
tan δ at 0° C., 60° C.: from the measurement of temperature-dependent dynamic damping to DIN 53513 (10 Hz, heating rate 1K·min$^{-1}$), where tan δ=E"/E'.
elongation at break, tensile stress at yield (to DIM 53504)
Resilience at 60° C., ΔG*, tan δ maximum (MTS) and tan δ at 60° C. are indicators of the hysteresis loss as the tyre rolls (rolling resistance). The higher the resilience at 60° C. and the lower the ΔG*, tan δ maximum (MTS) and tan δ at 60° C., the lower the rolling resistance of the tyre. Tan δ at 0° C. is a measure of wet skid resistance of the tyre. The higher the tan δ at 0° C., the higher the expected wet skid resistance of the tyre.

TABLE 1

Constituents of the tyre tread rubber compositions (figures in phr: parts by weight per 100 parts by weight of rubber)

|  | Comparative Example 2a | Comparative Example 2b | Comparative Example 2c | Inventive Example 2d |
|---|---|---|---|---|
| styrene-butadiene copolymer according to Example 1a | 70 | 0 | 0 | 0 |
| styrene-butadiene copolymer according to Example 1b | 0 | 70 | 0 | 0 |
| styrene-butadiene copolymer according to Example 1c | 0 | 0 | 70 | 0 |
| styrene-butadiene copolymer, according to Example 1d | 0 | 0 | 0 | 70 |
| high-cis polybutadiene (BUNA ™ CB 24 from Lanxess Deutschland GmbH) | 30 | 30 | 30 | 30 |
| silica (Ultrasil ® 7000) | 90 | 90 | 90 | 90 |
| carbon black (Vulcan ® J/N 375) | 7 | 7 | 7 | 7 |
| TDAE oil (Vivatec 500) | 36.3 | 36.3 | 36.3 | 36.3 |
| processing aid (Aflux 37 from Rheinehemie Rheinau GmbH) | 3 | 3 | 3 | 3 |
| stearic acid (Edenor C 18 98-100) | 1 | 1 | 1 | 1 |
| ageing stabilizer (Vulkanox ® 4020/LG from Lanxess Deutschland GmbH) | 2 | 2 | 2 | 2 |
| ageing stabilizer (Vulkanox ® HS/LG from Lanxess Deutschland GmbH) | 2 | 2 | 2 | 2 |
| zinc oxide (Rotsiegel zinc white) | 3 | 3 | 3 | 3 |
| wax (Antilux 654) | 2 | 2 | 2 | 2 |
| silane (Si 69 ® from Evonik) | 7.2 | 7.2 | 7.2 | 7.2 |
| diphenylguanidine (Rhenogran DPG 80) | 2.75 | 2.75 | 2.75 | 2.75 |
| sulphenamide (Vulkacit ® NZ/EGC from Lanxess | 1.6 | 1.6 | 1.6 | 1.6 |
| sulphur (Chancel 90/95 ground sulphur) | 1.6 | 1.6 | 1.6 | 1.6 |
| sulphonamide (Vulkalent ® E/C) | 0.2 | 0.2 | 0.2 | 0.2 |

TABLE 2

| | Comparative Example 3a | Comparative Example 3b | Comparative Example 3c | Inventive Example 3d |
|---|---|---|---|---|
| *vulcanizate properties* | | | | |
| rubber composition according to Comparative Example 2a | X | | | |
| rubber composition according to Comparative Example 2b | | X | | |
| rubber composition according to Comparative Example 2c | | | X | |
| rubber composition according to Comparative Example 2d | | | | X |
| Vulcanizate properties: | | | | |
| Resilience at 60° C. [%] | 56.2 | 56.1 | 58.7 | 59.7 |
| ΔG* (G*@0.5% − G*@15%) [MPa] | 1.37 | 1.08 | 1.08 | 0.81 |
| tan δ maximum (MTS amplitude sweep at 1 Hz, 60° C.) | 0.173 | 0.162 | 0.156 | 0.149 |
| tan δ at 0° C. (dynamic damping at 10 Hz) | 0.269 | 0.268 | 0.279 | 0.301 |
| tan δ at 60° C. (dynamic damping at 10 Hz) | 0.103 | 0.097 | 0.085 | 0.085 |
| Elongation at break (S2 specimen) [%] | 457 | 429 | 449 | 436 |
| Tensile stress at yield (S2 specimen) [MPa] | 19.4 | 18.5 | 20.8 | 19.8 |
| Abrasion (DIN 53516) [mm³] | 69 | 73 | 74 | 70 |

Tyre applications require a low rolling resistance, which exists when a high value for resilience at 60° C. and a low tan δ value in dynamic damping at high temperature (60° C.), and a low tan δ maximum in the MTS amplitude sweep, are measured in the vulcanizate. As is clear from Table 2, the vulcanizate of Inventive Example 3d is notable for high resilience at 60° C., a low tan δ value in dynamic damping at 60° C. and a low tan δ maximum in the MTS amplitude sweep.

Tyre applications additionally require a low wet skid resistance, which exists when the vulcanizate has a high tan δ value in dynamic damping at low temperature (0° C.). As is clear from Table 2, the vulcanizate of Inventive Example 3d is notable for a high tan δ value in dynamic damping at 0° C.

What is claimed is:

1. Diene polymers comprising:
at the start of the polymer chains, tertiary amino groups of the formula (Ia), (Ib), (IIa) or (IIb)

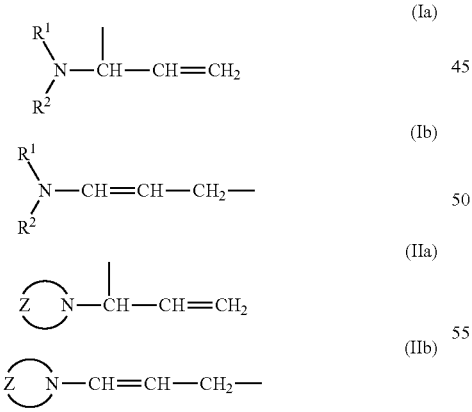

where
$R^1$, $R^2$ are the same or different and are each alkyl, cycloalkyl, aryl, alkaryl and aralkyl radicals which may contain heteroatoms, and
Z is a divalent organic radical which, as well as C and H, may contain heteroatoms, and
at the end of the polymer chains, silane-containing carbinol groups of the formula (III)

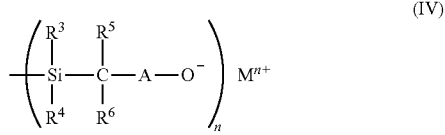

or
metal salts thereof or semimetal salts thereof, where
$R^3$, $R^4$, $R^5$, $R^6$ are the same or different and are each an H or alkyl, cycloalkyl, aryl, alkaryl and aralkyl radicals which may contain heteroatoms, and
A is a divalent organic radical which, as well as C and H, may contain heteroatoms.

2. The diene polymers according to claim 1, wherein the silane-containing carbinol groups of the formula (III) are in the form of metal salts of the formula (IV)

$$\left( \begin{array}{c} R^3 \quad R^5 \\ | \quad\quad | \\ -\text{Si}-\text{C}-\text{A}-\text{O}^- \\ | \quad\quad | \\ R^4 \quad R^6 \end{array} \right)_n M^{n+} \qquad (IV)$$

where
$R^3$, $R^4$, $R^5$, $R^6$ are the same or different and are each an H or alkyl, cycloalkyl, aryl, alkaryl and aralkyl radicals which may contain heteroatoms,
A is a divalent organic radical which, as well as C and H, may contain heteroatoms,
N is an integer from 1 to 4, and
M is a metal or semimetal of valency 1 to 4.

3. The diene polymers according to claim 1 or 2, wherein the diene polymer is a polybutadiene, a polyisoprene, a butadiene-isoprene copolymer, a butadiene-styrene copolymer, an isoprene-styrene copolymer, or a butadiene-isoprene-styrene terpolymer.

4. The diene polymers according to claim 2, wherein:
the heteroatoms are selected from the group consisting of O, N, S, Si, and any combination thereof, and
M is selected from the group consisting of Li, Na, K, Mg, Fe, Co, Ni, Al, Nd, Ti, Si, Sn, and any combination thereof.

5. The diene polymers according to claim 1, wherein:
the diene polymers have mean molar masses (number-average) of 10,000 to 2,000,000 g/mol,
the diene polymers have glass transition temperatures of −110° C. to +20° C., and
the diene polymers have Mooney viscosities [ML 1+4 (100° C.)] of 10 to 200 Mooney units.

6. The diene polymers according to claim 1, wherein:
the diene polymers have mean molar masses (number-average) of 100,000 to 1,000,000 g/mol,
the diene polymers have glass transition temperatures of −110° C. to 0° C., and
the diene polymers have Mooney viscosities [ML 1+4 (100° C.)] of 30 to 150, Mooney units.

7. A process for preparing diene polymers according to claim 1, the process comprising:
introducing functional groups at the end of the polymer chains by reaction of the polymer chains with functionalization reagents of one or more 1-oxa-2-silacycloalkanes, and
introducing the tertiary amino groups at the start of the polymer chains by reaction of the polymer chains with tertiary allylamine-containing polymerization initiators of the general formula (Va), (Vb), (VIa) or (VIb)

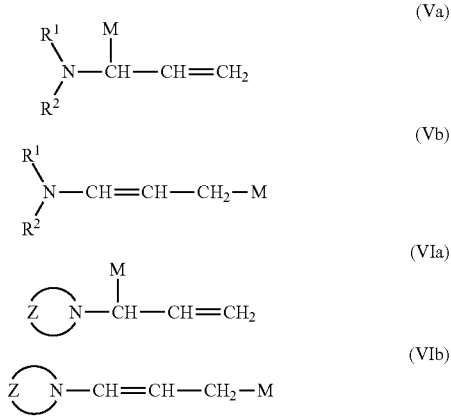

where
R$^1$, R$^2$ are the same or different and are each alkyl, cycloalkyl, aryl, alkaryl and aralkyl radicals which may contain heteroatoms,
Z is a divalent organic radical which, as well as C and H, may contain heteroatoms, and
M is Li, Na, K.

8. The process according to claim 7, wherein the 1-oxa-2-silacycloalkanes are compounds of the general formula (VII)

where
R$^3$, R$^4$, R$^5$, R$^6$ are the same or different and are each H, alkyl, cycloalkyl, aryl, alkaryl and aralkyl radicals which may contain heteroatoms, and A is a divalent organic radical which, as well as C and H, may contain heteroatoms.

9. The process for preparing diene polymers according to claim 7, further comprising:
obtaining the polymerization initiators by reaction of tertiary allylamines with organo-alkali metal compounds in situ or in a separate preforming step, and
reacting reactive ends of the polymer chains with one or more 1-oxa-2-silacycloalkanes.

10. The process according to claim 7, wherein the 1-oxa-2-silacycloalkanes are added after completion of the polymerization.

11. The process according to claim 7, wherein the anionic polymerization initiators are obtained by reaction of tertiary allylamines with organo-alkali metal compounds.

12. The process according to claim 9, wherein the tertiary allylamine is N,N-dimethylallylamine, and the organo-alkali metal compound is butyllithium.

13. The process according to claim 9, wherein:
the molar amount of tertiary allylamines is less than or equal to the molar amount of organo-alkali metal compounds, and
the amount of 1-oxa-2-silacycloalkanes is between 0.005-2% by weight, based on the amount of polymer having reactive ends of the polymer chains.

14. The process according to claim 9, wherein:
the ratio of the molar amount of tertiary allylamines to the molar amount of organo-alkali metal compounds is 0.05-2.00:0.05-2.00, and
the amount of 1-oxa-2-silacycloalkanes is between 0.01-1% by weight, based on the amount of polymer having reactive ends of the polymer chains.

15. The process according to claim 7, wherein coupling reagents are used for the reaction.

16. A method for producing vulcanizable rubber compositions, the method comprising producing the vulcanizable rubber compositions from diene polymers according to claim 1.

17. Vulcanizable rubber compositions obtained according to claim 16, wherein the vulcanizable rubber compositions additionally comprise ageing stabilizers, oils, fillers, rubbers and/or rubber auxiliaries.

18. Vulcanizable rubber compositions comprising diene polymers according to claim 1 or 2.

19. Vulcanizable rubber compositions comprising functionalized diene polymers having tertiary amino groups of the formula (Ia), (Ib), (IIa) or (IIb) at the start of the polymer chains and functional groups of the formula (III) at the end of the polymer chains according to claim 1.

20. Vulcanizable rubber compositions comprising functionalized diene polymers having tertiary amino groups of the formula (Ia), (Ib), (IIa) or (IIb) at the start of the polymer chains and functional groups of the formula (IV) at the end of the polymer chains according to claim 2.

21. Vulcanizable rubber compositions comprising functionalized diene polymers having tertiary amino groups of the formula (Ia), (Ib), (IIa) or (IIb) at the start of the polymer chains and functional groups of the formula (III) and (IV) at the end of the polymer chains according to claim 2.

22. A method for producing tyres, the method comprising producing at least tyre tread of the tyres from the vulcanizable rubber compositions according to claim 19.

23. A method for producing moulded articles, the method comprising producing moulded articles from the vulcanizable rubber compositions according to claim 19.

24. Tyres according to claim 22.

25. Moulded articles obtainable according to claim 23, wherein the moulded articles comprise cable sheaths, hoses, drive belts, conveyor belts, roll covers, shoe soles, sealing rings and damping elements.

\* \* \* \* \*